United States Patent
Lee et al.

(10) Patent No.: US 9,433,006 B2
(45) Date of Patent: Aug. 30, 2016

(54) METHOD FOR TRANSMITTING CHANNEL MEASUREMENT INFORMATION IN WIRELESS COMMUNICATION SYSTEM AND DEVICE THEREFOR

(71) Applicant: LG ELECTRONICS INC., Seoul (KR)

(72) Inventors: Jaewook Lee, Anyang-si (KR); Sungjun Park, Anyang-si (KR); Sunghoon Jung, Anyang-si (KR); Youngdae Lee, Anyang-si (KR); Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/361,263

(22) PCT Filed: Jan. 21, 2013

(86) PCT No.: PCT/KR2013/000465
§ 371 (c)(1),
(2) Date: May 28, 2014

(87) PCT Pub. No.: WO2013/115514
PCT Pub. Date: Aug. 8, 2013

(65) Prior Publication Data
US 2014/0341193 A1 Nov. 20, 2014

Related U.S. Application Data

(60) Provisional application No. 61/593,311, filed on Feb. 1, 2012, provisional application No. 61/603,368, filed on Feb. 26, 2012, provisional application No. 61/677,492, filed on Jul. 31, 2012.

(51) Int. Cl.
*H04W 4/00* (2009.01)
*H04W 72/08* (2009.01)
(Continued)

(52) U.S. Cl.
CPC .......... *H04W 72/082* (2013.01); *H04W 24/10* (2013.01); *H04W 72/1215* (2013.01); *H04W 88/06* (2013.01)

(58) Field of Classification Search
CPC ........................ H04W 72/082; H04W 24/10
USPC ................. 370/252, 329, 330, 336
See application file for complete search history.

(56) References Cited

U.S. PATENT DOCUMENTS

2007/0263709 A1  11/2007  Kasslin et al.
2009/0054095 A1*  2/2009  Corke ............... H04W 72/02
455/509

(Continued)

FOREIGN PATENT DOCUMENTS

KR  1999-021380 A  3/1999
WO  WO 2011/005537 A2  1/2011

*Primary Examiner* — Farah Faroul
(74) *Attorney, Agent, or Firm* — Birch, Stewart, Kolasch & Birch, LLP

(57) ABSTRACT

A method in which a first communication module of a terminal transmits channel measurement information to a base station in a wireless communication system and a device therefor are disclosed in the present invention. Specifically, the method comprises the steps of: receiving a message indicating an operation start of at least one second communication module coexisting in the terminal from the second communication module; determining an unusable frequency due to in-device coexistence (IDC) interference on the basis of information on an operating frequency of the first communication module and an operating frequency of the second communication module; and transmitting an IDC interference indication message including channel measurement information corresponding to the determined unusable frequency to the base station.

18 Claims, 10 Drawing Sheets

(51) Int. Cl.
*H04W 24/10* (2009.01)
*H04W 72/12* (2009.01)
*H04W 88/06* (2009.01)

(56) References Cited

U.S. PATENT DOCUMENTS

| | | | |
|---|---|---|---|
| 2010/0046498 A1 | 2/2010 | Hall | |
| 2011/0103326 A1* | 5/2011 | Kim | H04L 1/1812 370/329 |
| 2012/0020231 A1 | 1/2012 | Chen et al. | |
| 2012/0163223 A1* | 6/2012 | Lo | H04L 5/0007 370/252 |
| 2012/0207101 A1* | 8/2012 | Chang | H04W 74/0825 370/329 |
| 2012/0275390 A1* | 11/2012 | Korhonen | H04W 74/006 370/329 |
| 2013/0016687 A1* | 1/2013 | Yang | H04L 1/1614 370/329 |
| 2013/0136027 A1* | 5/2013 | Matsuo | H04W 24/10 370/252 |
| 2013/0176885 A1* | 7/2013 | Lee | H04W 36/0083 370/252 |
| 2013/0176891 A1* | 7/2013 | Lee | H04W 24/10 370/252 |
| 2014/0022961 A1* | 1/2014 | Park | H04W 52/146 370/280 |
| 2014/0155118 A1* | 6/2014 | Tsuda | H04W 88/06 455/522 |
| 2014/0335868 A1* | 11/2014 | Kubota | H04W 36/0088 455/437 |
| 2014/0355471 A1* | 12/2014 | Lee | H04W 24/10 370/252 |
| 2014/0369329 A1* | 12/2014 | Lee | H04W 28/06 370/338 |
| 2015/0043440 A1* | 2/2015 | Ko | H04W 74/04 370/329 |
| 2015/0215962 A1* | 7/2015 | Mizusawa | H04W 16/16 370/280 |
| 2015/0222410 A1* | 8/2015 | Belghoul | H04W 28/085 370/252 |

* cited by examiner

FIG. 3
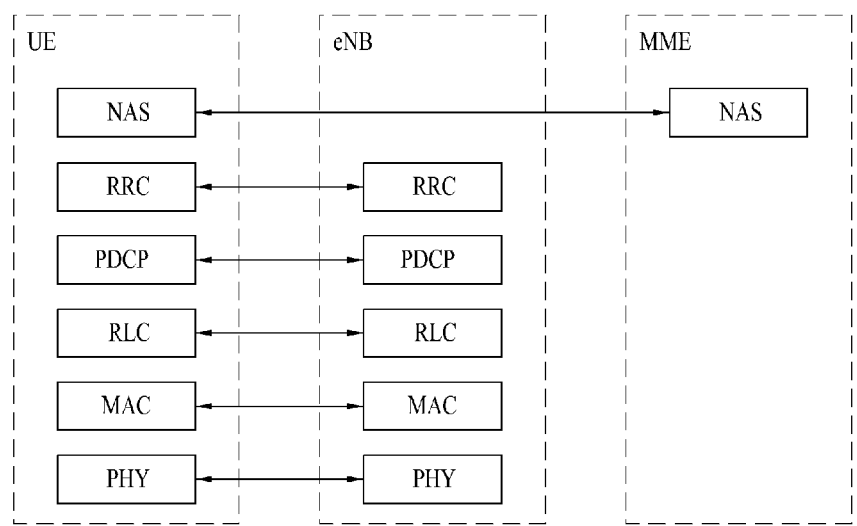
(a) control-plane protocol stack
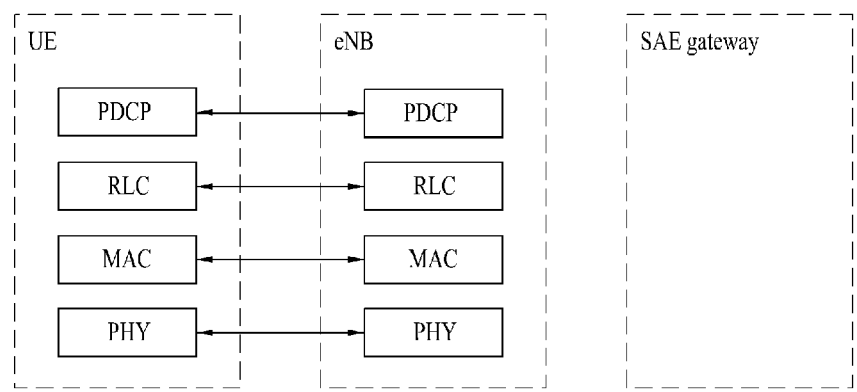
(b) user-plane protocol stack

METHOD FOR TRANSMITTING CHANNEL MEASUREMENT INFORMATION IN WIRELESS COMMUNICATION SYSTEM AND DEVICE THEREFOR

CROSS REFERENCE TO RELATED APPLICATIONS

This non-provisional application is a National Stage entry under U.S.C. §371 of International Application No. PCT/KR2013/000465 filed on Jan. 21, 2013, which claims the benefit of U.S. Provisional Application Nos. 61/593,311 filed on Feb. 1, 2012, 61/603,368 filed on Feb. 26, 2012 and 61/677,492 filed on Jul. 31, 2012. The entire contents of all of the above applications are hereby incorporated by reference.

TECHNICAL FIELD

The present invention relates to a wireless communication system, and more particularly, to a method for transmitting channel measurement information in a wireless communication system and a device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system.

For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the conventional problem is to provide a method for transmitting IDC interference information including channel measurement information in a wireless communication system and a device therefor.

Technical Solution

In one aspect of the present invention, a method for allowing a first communication module of a user equipment to transmit channel measurement information to a base station in a wireless communication system comprises the steps of receiving a message indicating an operation start of at least one second communication module coexisting in the user equipment from the second communication module; determining an unusable frequency due to in-device coexistence (IDC) interference on the basis of information on an operating frequency of the first communication module and an operating frequency of the second communication module; and transmitting an IDC interference indication message including channel measurement information corresponding to the determined unusable frequency to the base station. In this case, the channel measurement information is the information associated with a cell, which satisfies a predetermined reference, on at least one frequency not the unusable frequency, and the information associated with the cell includes at least one of frequency information associated with the cell and a measured result of the cell. Moreover, the predetermined reference may be defined differently in accordance with radio access technology (RAT). The predetermined reference has the highest channel quality on at least one frequency not the unusable frequency. Preferably, the channel quality is reference signal received quality (RSRQ). Moreover, the IDC interference indication message may include information associated with the unusable frequency and time division multiplexing (TDM) information. Moreover, if the unusable frequency is a non-serving frequency and a serving frequency is usable, the channel measurement information includes information only on the determined unusable frequency. Moreover, the wireless communication system supports carrier aggregation, and the serving frequency is a primary frequency. Furthermore, if the determined unusable frequency is a secondary frequency and the primary frequency is usable, the channel measurement information includes information only on the determined unusable frequency. Preferably, the method may further comprise the step of deactivating a secondary cell configured on the secondary frequency.

Preferably, operation start of the at least one second communication module is a power on operation of the second communication module or a traffic transmission and reception operation of the second communication module. The at least one second communication module includes a transceiver module for WiFi system, a Bluetooth transceiver module, and a global positioning system (GPS) receiving module.

In another aspect of the present invention, a user equipment in a wireless communication system comprises a first communication module for transmitting and receiving a signal to and from a first communication system; and at least one second communication module for transmitting and receiving a signal to and from another communication system, wherein the first communication module receives a message indicating an operation start of the second communication module coexisting in the user equipment from the second communication module, determines an unusable frequency due to in-device coexistence (IDC) interference on the basis of information on an operating frequency of the first communication module and an operating frequency of the second communication module, and transmits an IDC interference indication message including channel measurement information corresponding to the determined unusable frequency to the base station.

Advantageous Effects

According to the aforementioned embodiments of the present invention, the user equipment may effectively perform handover by transmitting channel measurement information together with IDC interference information.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 3 is a diagram illustrating structures of a control plane and a user plane of a radio interface protocol between a user equipment and an E-UTRAN based on the 3GPP radio access network standard;

BEST MODE FOR CARRYING OUT THE INVENTION

Hereinafter, configurations, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

Figure 1:
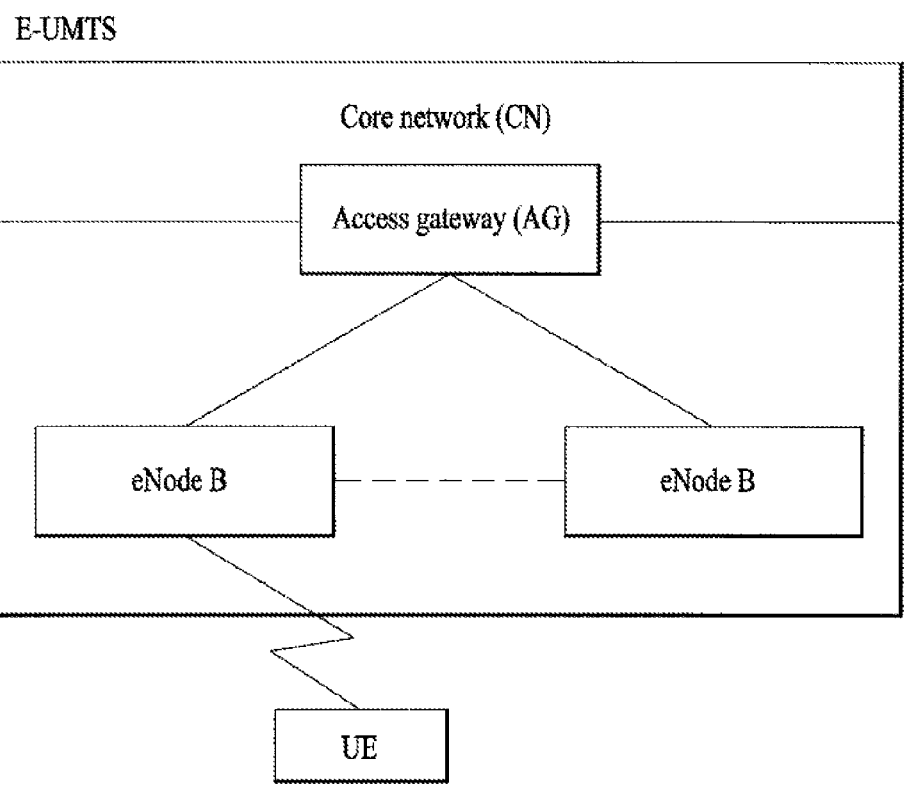
FIG. 1 is a diagram briefly illustrating a network structure of an Evolved Universal Mobile Telecommunications System (E-UMTS), which is an example of a wireless communication system.
Figure 2:
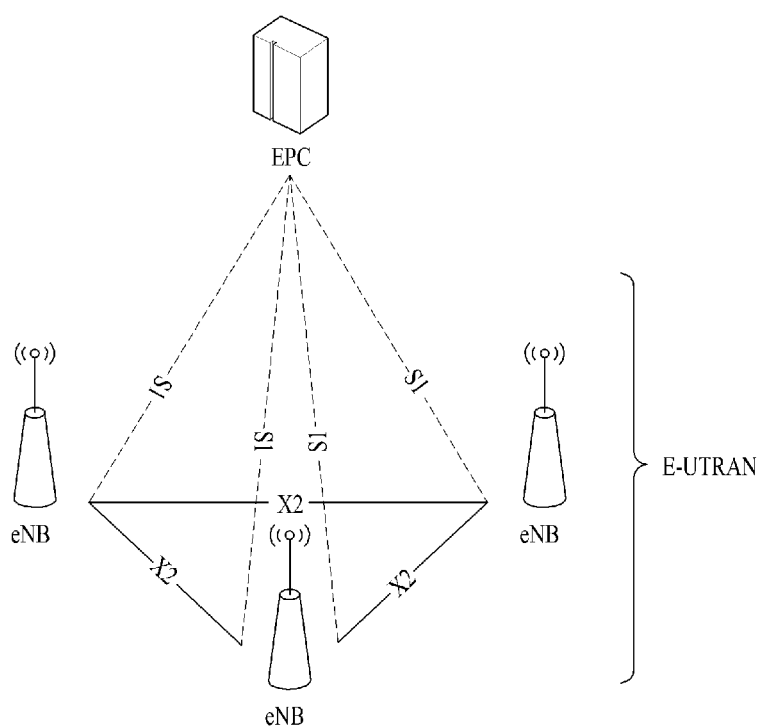
FIG. 2 is a diagram conceptionally illustrating a network structure of an evolved universal terrestrial radio access network (E-UTRAN)

FIG. 2 is a diagram conceptionally illustrating a network structure of an Evolved Universal Terrestrial Radio Access Network (E-UTRAN) which is an example of a mobile communication system. In particular, the E-UTRAN system is an evolved version of the conventional UTRAN system. The E-UTRAN includes cells (eNBs), which are connected with each other through an interface X2. Also, each of the cells is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other.

One cell constituting a base station eNB is set to one of bandwidths of 1.25, 2.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Since the E-UTRAN may identify the presence of the user equipment which is in the RRC_CONNECTED state, on the basis of cell unit, the E-UTRAN may effectively control the user equipment. On the other hand, the E-UTRAN may not identify the user equipment which is in the RRC_IDLE state, on the basis of cell unit. In this case, the user equipment is managed by the core network (CN) on the basis of tracking area (TA) unit which is a local unit greater than the cell unit.

In other words, in order that the user equipment which is in the RRC_IDLE state receives a normal mobile communication service such as voice or data, the user equipment should be shifted to the RRC_CONNECTED state.

In particular, when the user initially turns on the power of the user equipment, the user equipment searches for a proper cell and then is maintained in the RRC_IDLE state in the corresponding cell. The user equipment maintained in the RRC idle state performs RRC connection establishment procedure with the RRC layer of the E-UTRAN only if the RRC connection is required, and then is shifted to the RRC_CONNECTED state. In this case, the case where the RRC connection is required may include a case where uplink data transmission is required due to calling attempt of the user or a case where a response message to a paging message received from the E-UTRAN should be transmitted.

Figure 4:
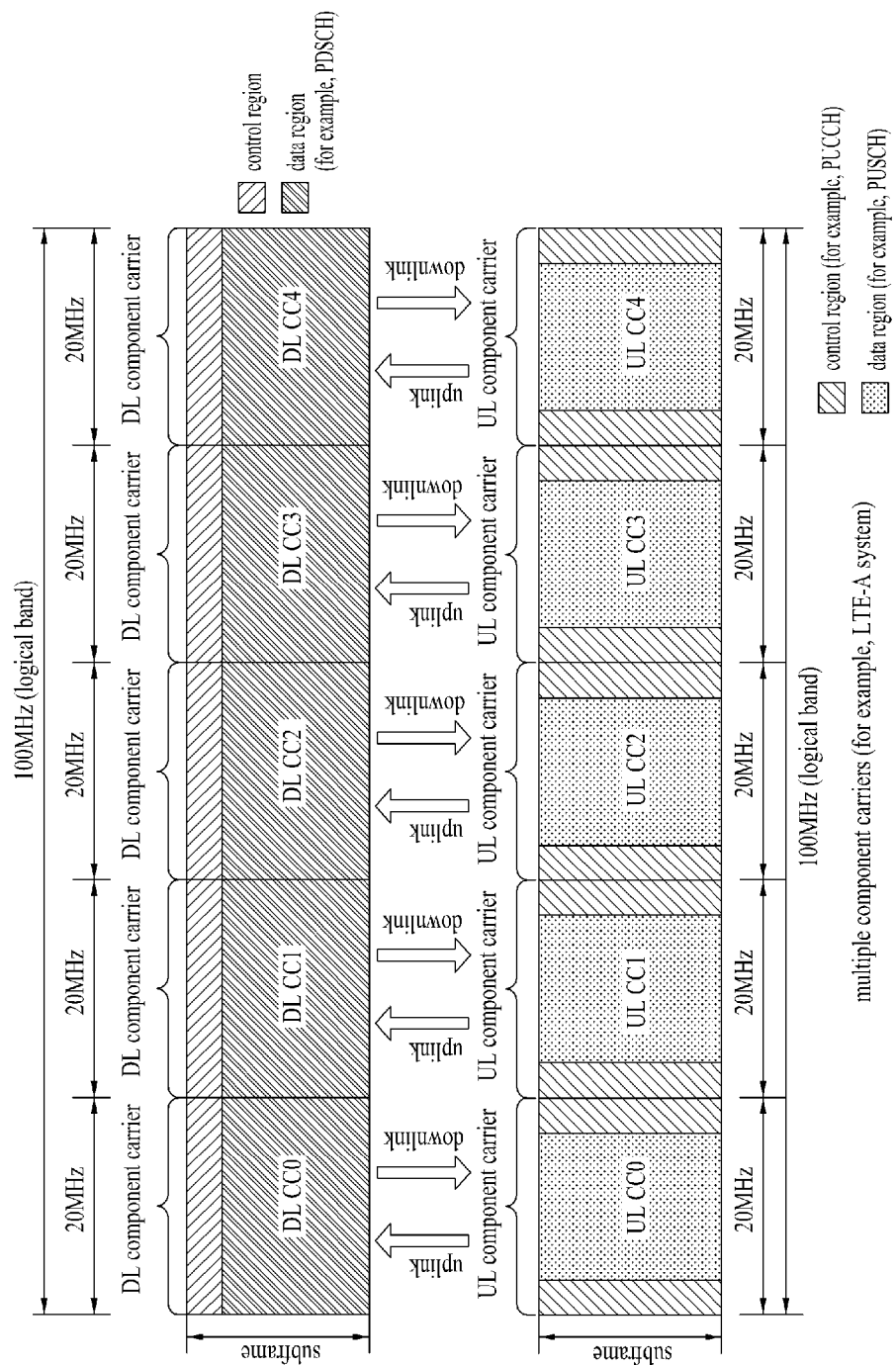
FIG. 4 is a diagram illustrating a carrier aggregation (CA) communication system.

FIG. 4 is a diagram illustrating a carrier aggregation (CA) communication system. The LTE-A system uses the carrier aggregation technology or the bandwidth aggregation technology, which uses greater uplink/downlink (UL/DL) bandwidth through a plurality of uplink/downlink frequency blocks, to use wider frequency bandwidth. Each frequency block is transmitted using a component carrier (CC). The component carrier may be understood as carrier frequency (or center carrier or center frequency) for a corresponding frequency block.

Referring to FIG. 4, the plurality of UL/DL component carriers (CCs) may be collected to support the wider UL/DL bandwidth. The respective CCs may adjoin each other or not in the frequency domain. A bandwidth of each CC may be determined independently. Asymmetric carrier aggregation where the number of UL CCs is different from the number of DL CCs may be performed. For example, if the number of DL CCs is 2 and the number of UL CCs is 1, DL CC/UL CC links may be fixed to the system or may be configured semi-statically. Also, even though a system full bandwidth includes N number of CCs, a frequency bandwidth that may be monitored and received by a specific user equipment may be limited to M(<N) number of CCs. Various parameters for carrier aggregation may be configured cell-specifically, UE group-specifically, or UE-specifically. Meanwhile, control information may be set to be transmitted and received through a specific CC only. This specific CC may be referred to as a primary CC (PCC) (or anchor CC), and the other CCs may be referred to as secondary CCs (SCC).

The LTE-A system uses a concept of a cell to manage radio resources [see 36.300 V10.2.0 (2010-12) 5.5. Carrier Aggregation; 7.5. Carrier Aggregation]. The cell is defined by combination of downlink resources and uplink resources, wherein the uplink resources may be defined selectively. Accordingly, the cell may be configured by downlink resources only, or may be configured by downlink resources and uplink resources. If carrier aggregation is supported, linkage between carrier frequency (or DL CC) of the downlink resources and carrier frequency (or UL CC) of the uplink resources may be indicated by system information. The cell operated on the primary frequency (or PCC) may be referred to as a primary cell (PCell), and the cell operated on the secondary frequency (or SCC) may be referred to as a secondary cell (SCell). The PCell is used such that the user equipment performs an initial connection establishment procedure or connection re-establishment procedure. The PCell may refer to a cell indicated during a handover procedure. The SCell may be configured after RRC connection is established, and may be used to provide an additional radio resource. The PCell and the SCell may be referred to as serving cells. Accordingly, although the user equipment is in RRC-CONNECTED state, if it is not set by carrier aggregation or does not support carrier aggregation, a single serving cell configured by the P cell only exists. On the other hand, if the user equipment is in the RRC-CONNECTED state and is set by carrier aggregation, one or more serving cells may exist, wherein the serving cells may include the PCell and full SCells. After an initial security activation procedure starts, for the user equipment supporting carrier aggregation, the network may configure one or more SCells in addition to the PCell initially configured during a connection establishment procedure.

If cross-carrier scheduling (or cross-CC scheduling) is used, the PDCCH for downlink allocation is transmitted to DL CC#0, and the corresponding PDSCH may be transmitted to DL CC#2. For cross-carrier scheduling, introduction of a carrier indicator field (CIF) may be considered. The presence of CIF within the PDCCH may be configured by higher layer signaling (for example, RRC signaling) semi-statically and user equipment-specifically (or user equipment group-specifically). The base line of PDCCH transmission will be summed up as follows.

CIF disabled: the PDCCH on the DL CC allocates PDSCH resource on the same DL CC or PUSCH resource on one linked UL CC.

CIF enabled: the PDCCH on the DL CC may allocate PDSCH or PUSCH resource on a specific DL/UL CC among a plurality of aggregated DL/UL CCs by using the CIF.

If the CIF exists, the base station may allocate a PDCCH monitoring DL cell set to reduce load of blind decoding (BD) in view of the user equipment. The PDCCH monitoring DL cell set includes one or more DL CCs as a part of the aggregated DL CCs, and the user equipment detects and decodes the PDCCH on the corresponding DL CC only. In other words, if the base station schedules the PDSCH/PUSCH to the user equipment, the PDCCH is transmitted through the PDCCH monitoring DL CC set only. The PDCCH monitoring DL CC set may be configured user equipment-specifically, user equipment group-specifically or cell-specifically. The terminology "PDCCH monitoring DL CC" may be replaced with its equivalent terminologies such as monitoring carrier and monitoring cell. Also, CC aggregated for the user equipment may be replaced with its equivalent terminologies such as serving CC, serving carrier, and serving cell.

Hereinafter, measurement and measurement report will be described.

In the following description, 'measurement' may be defined that the user equipment measures a quality value of a corresponding cell by receiving reference signals received from cells located in inter-frequency, intra-frequency and inter-RAT in accordance with measurement configuration received from the network. Also, 'quality' means signal quality or cell quality identified by the reference signal received from a target cell for measurement.

In respect of mobility support of the user equipment in the mobile communication system, the user equipment continues to measure quality of a serving cell, which currently provides a service, and quality of a neighboring cell per at least discontinuous reception (DRX) period. The user equipment reports the measured result of cell quality to the network at a proper time, and the network provides optimized mobility to the user equipment through handover, etc.

The user equipment may perform measurement of a specific purpose set by the network to provide information, which may assist a network provider to manage the network, in addition to the purpose of mobility support, and may report the measured result of cell quality to the network. For example, the user equipment receives broadcast information of a specific cell determined by the network. The user equipment may report cell identify (referred to as global cell identity) of the specific cell, location identification information (for example, tracking area code) to which the specific cell belongs, and/or other cell information (for example, whether the cell is a member of a closed subscriber group (CSG) cell or not) to the serving cell.

If the user equipment which is moving identifies that quality of a specific zone is very bad, through measurement, the user equipment may report location information of the cells of which quality is bad and the measured result of cell quality to the network. The network may optimize the network on the basis of the report of the measured result of cell quality of the user equipments that assist management of the network.

In a mobile communication system of which frequency reuse factor is 1, most of mobility is made between different cells of the same frequency band. Accordingly, in order to ensure mobility of the user equipment, the user equipment should measure quality of neighboring cells having the same center frequency as that of the serving cell and cell information well. In this way, measurement of the cell having the same center frequency as that of the serving cell will be referred to as intra-frequency measurement. The user equipment performs intra-frequency measurement and timely reports the result of measurement of cell quality to the network, whereby the purpose of the measured result of corresponding cell quality may be obtained.

A mobile communication provider may manage the network by using a plurality of frequency bands. If a service of the communication system is provided through the plurality of frequency bands, in order to ensure optimized mobility of the user equipment, the user equipment should measure quality of neighboring cells having center frequency different from that of the serving cell and cell information well. In this way, measurement of the cell having center frequency different from that of the serving cell will be referred to as inter-frequency measurement. The user equipment should perform inter-frequency measurement and timely report the result of measurement of cell quality to the network.

If the user equipment supports measurement of heterogeneous networks, cell measurement of the heterogeneous networks may be performed by setup of the base station. This measurement of the heterogeneous networks will be referred to as inter-radio access technology (inter-RAT) measurement. For example, RAT may include a UMTS Terrestrial Radio Access Network (UTRAN) and a GSM EDGE Radio Access Network (GERAN) according to the 3GPP standard specifications, and may also include CDMA 2000 system according to the 3GPP2 standard specifications.

Hereinafter, In-Device Coexistence (IDC) and IDC interference will be described.

In order that the user accesses various networks anytime anywhere, it is required that one user equipment should be provided with a transceiver for a wireless communication system such as LTE, WiFi, and Bluetooth (BT) and a global navigation satellite system (GNSS) receiver. Coexistence of different wireless communication systems in one user equipment will be referred to as IDC (In-Device Coexistence). Such examples may include a user equipment provided with LTE and BT modules for VoIP service and multimedia service through a BT earphone, a user equipment provided with LTE and WiFi modules for traffic distribution, and a user equipment provided with GNSS and LTE modules for additionally acquiring location information.

Figure 5:
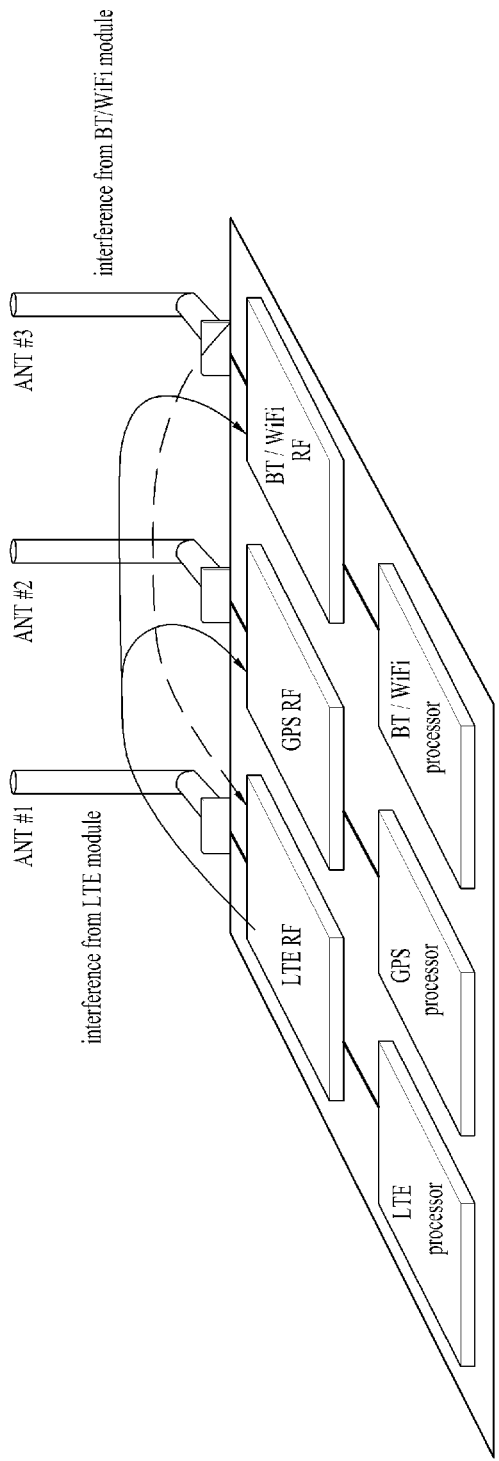
FIG. 5 is a diagram illustrating a user equipment that includes wireless communication modules for an LTE system, a global positioning system (GPS), and a BT/WiFi system.

FIG. 5 is a diagram illustrating a user equipment that includes wireless communication modules for an LTE system, a global positioning system (GPS) and a BT/WiFi system.

Referring to FIG. 5, as several transceivers are located near one another within one user equipment, the power of a signal transmitted from one transceiver may be greater than that of a signal transmitted from another transceiver. In this case, interference may occur between different communication modules. This interference will be referred to as IDC interference. If IDC interference becomes serious, even though there is no problem in connection between the user equipment and the base station, ping-pong status where handover continues to be tried may occur.

Generally, the communication modules may be operated at neighboring frequencies as follows in view of frequency, whereby mutual interference of the communication modules may be reduced.

The LTE module may be operated at TDD Band 40 (2300 MHz to 2400 MHz), and the WiFi module or the Bluetooth module may be operated at 2400 MHz to 2483.5 MHz which correspond to an unlicensed band. In this case, transmission of the LTE module may cause interference against the WiFi module or the Bluetooth module, and transmission of the WiFi module or the Bluetooth module may cause interference against reception of the LTE module.

Also, the LTE module may perform uplink transmission at FDD Band 7 (2500 MHz to 2700 MHz), and the Bluetooth module may be operated at 2400 MHz to 2483.5 MHz which correspond to an unlicensed band. In this case, uplink transmission of the LTE module may cause interference against reception of the WiFi module or the Bluetooth module.

Also, the LTE module may be operated at FDD Band 13 (UL: 777-787 MHz, DL: 746-756 MHz) or FDD Band 14 (UL: 788-798 MHz, DL: 758-768 MHz), and the GPS module may receive location information at 1575.42 MHz. In this case, uplink transmission of the LTE module may cause interference against reception of location information of the GPS module.

As one of solutions of the above problems, IDC interference between two transceivers may be prevented from occurring by allowing a frequency interval between respective transceiving signals or physical filters to be obtained sufficiently. However, if several wireless communication modules are operated at neighboring frequencies, it is difficult for the current filter technology to sufficiently eliminate interference.

Separately from an application method of a physical filter scheme, an IDC interference avoidance scheme may be considered about three cases as follows depending on whether there is any coordination with another communication module which coexists with the LTE module and there is any coordination between the LTE module and the base station to eliminate IDC interference.

The first case is that there is no coordination between the communication modules coexisting within one user equipment and between the LTE module and the base station to avoid IDC interference. In this case, the LTE module does not know information on the other communication module that coexists with the LTE module.

The second case is that there is coordination between communication modules coexisting within the user equipment. In this case, the LTE module may know action state (that is, ON/OFF state) between the coexisting modules, traffic transmission state, etc.

Finally, the third case is that there exists coordination between the user equipment as well as coordination between the modules coexisting within the user equipment. The LTE module may measure IDC interference through inter/intra frequency measurement as well as coordination with another module.

In the current 3GPP system, to solve the problem of IDC interference, 1) a method (frequency division multiplexing (FDM) method) for allowing a communication module, which causes interference, or a communication module affected by interference to change frequency, and 2) a method (time division multiplexing (TDM) method) for allowing coexisting communication modules to use one frequency through time division are considered.

As described above, since IDC interference occurs in one user equipment, if the user equipment does not notify the base station of occurrence of IDC interference, the base station does not know occurrence of IDC interference. Accordingly, the user equipment needs to notify the base station of its IDC interference information, whereby the base station may perform handover for moving a frequency used for solving the IDC interference problem to another frequency and scheduling for using time resources through division. In other words, if IDC interference occurs, the user equipment needs to notify the base station of information (for example, frequency at which IDC interference occurs, pattern information for performing TDM scheme, etc.) required for performing FDM/TDM in the base station.

In other words, if IDC interference occurs and the user equipment reports occurrence of IDC interference to the base station, the base station that has received the IDC interference status may perform handover for the corresponding user equipment to another frequency to solve the interference status of the user equipment. In order that the base station successfully performs handover, information as to handover for the user equipment to another cell is required. If the base station performs handover for the corresponding user equipment without such information, Quality of Service (QoS) of the user equipment may be deteriorated due to channel quality which is not good, after the user equipment moves to another cell.

Also, if the base station stands by until the user equipment reports the measured result on the basis of measurement information which is previously configured (measurement configuration), delay of handover may occur for the time when the base station waits for the measured result message after receiving IDC interference status report message. For this reason, the user equipment may be subjected to IDC interference for additional time, and QoS of the user equipment may be deteriorated for the additional time.

Accordingly, the present invention suggests a method for allowing a user equipment to transmit IDC interference status to a base station together with channel measurement information, whereby the base station may quickly solve an IDC interference problem of the LTE module which is RRC_CONNECTED state within the user equipment if the IDC interference problem occurs.

In the embodiment of the present invention, if a specific frequency of the LTE module of the user equipment is unusable (due to IDC interference), a method for transmitting the IDC interference status to the base station together with channel measurement information is suggested. In the present invention, it is assumed that the LTE module may identify a frequency at which IDC interference occurs through internal coordination between the communication modules as well as actual measurement of IDC interference.

In the present invention, channel measurement information may include at least one of cell identity of a measurement target, frequency information, and measured or assessed results.

The measured results include reference signal received power (RSRP) and/or reference signal received quality (RSRQ). Parameters associated with channel quality or power may be included in the measured results in accordance with radio access technology (RAT) of the user equipment. In other words, parameters related to received signal code power (RSCP), carrier to noise ratio (EcNO), received signal strength indication (RSSI), and pilot signal strength may be included in the channel measurement information in accordance with RAT.

The channel measurement information to be reported from the user equipment to the base station includes measurement information of a cell located at another frequency and measurement information of a cell in case of another RAT, as well as that of a cell to which the user equipment belongs.

Also, the channel measurement information may be information on all the cells measured by the user equipment or information on a cell that satisfies a specific reference. For example, the information on a cell that satisfies a specific reference may be information on N (N is a fixed value or may be set randomly by the base station, etc.) number of higher cells having good channel quality (for example, received signal received quality (RSRQ)) or good power (for example, reference signal received power (RSRP)) for a certain time among the cells measured by the user equipment. Alternatively, the information on a cell that satisfies a specific reference may be information on N number of higher cells among the cells measured by the user equipment when channel quality or power is sorted in a descending order while passing a threshold reference for a certain time.

A fixed value which is previously determined may be used as a (time or threshold) reference for selection of the channel measurement information may, or the (time or threshold) reference may be set randomly by the base station. Also, the reference of channel quality or power may be varied depending on RAT, and RSRP, RSRQ, RSCP, EcNO, RSSI, pilot strength may be used as the reference of channel quality or power depending on RAT. In such channel measurement information, cell associated information included in the unusable frequency may be excluded by the user equipment.

The user equipment may transmit the channel measurement information to the base station if a specific condition is satisfied. For example, the user equipment may transmit the channel measurement information to the base station only if a specific frequency is unusable. Hereinafter, the unusable frequency will be defined when serious interference occurs or is expected to occur in reception (or reception of ISM/GNSS due to transmission at a serving frequency of LTE) at LTE serving frequency due to transmission of ISM. Also, channel measurement information corresponding to the unusable frequency is defined as that transmitted by the user equipment for FDM or TDM (for example, handover) of the base station if a specific frequency is unusable (due to IDC interference, etc.).

For example, if the serving frequency is unusable, the user equipment may transmit the channel measurement information to the base station. Moreover, if the unusable frequency is a non-serving frequency and the serving frequency is usable, the channel measurement information which includes information only on the unusable frequency may be transmitted.

In the wireless communication system that uses carrier aggregation (CA), according to the present invention, if a primary frequency is unusable, the user equipment may be configured to transmit channel measurement information to the base station. Moreover, if the primary frequency is usable but a secondary frequency is unusable, or if the other frequency not the serving frequency is only unusable, the channel measurement information of the user equipment may not be transmitted.

Alternatively, if a non-serving frequency is unusable or if the primary frequency is usable but the secondary frequency is unusable, DRX pattern requested by the user equipment and TDM information, which includes bitmap information, may not be transmitted to the base station.

Also, if the primary frequency is usable but the secondary frequency is unusable, a secondary cell (Scell) activated at the corresponding secondary frequency may automatically be subjected to deactivation or deconfiguration.

Figure 6:
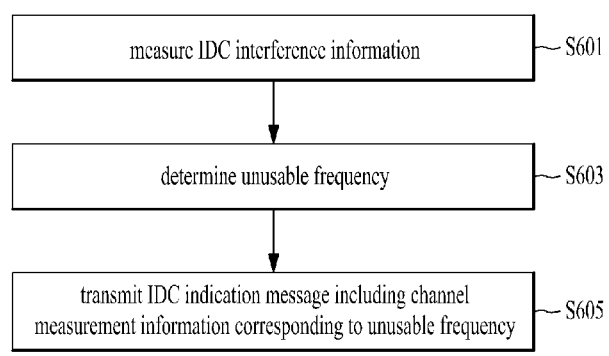
FIG. 6 is a diagram illustrating a method for transmitting channel measurement information in accordance with one embodiment of the present invention.

FIG. 6 is a flow chart illustrating a method for transmitting channel measurement information in accordance with one embodiment of the present invention. The method for transmitting channel measurement in accordance with one embodiment of the present invention will be described with reference to FIG. 6.

The LTE module of the user equipment configures at least one frequency measurement from the base station. Accordingly, if the communication modules that coexist within the user equipment start their operation, the LTE module measures IDC interference information (S601). At this time, the communication modules that coexist within the user equipment may notify the LTE module of information such as operation frequency and transmission power, which are required to measure information of IDC interference.

The LTE module of the user equipment determines the unusable frequency if the LTE module recognizes that IDC interference has occurred (S603).

The LTE module of the user equipment is configured to include channel measurement information (for example, required for the base station to perform FDM/TDM if the unusable frequency corresponds to the serving frequency) corresponding to the unusable frequency in an IDC indication message, and notifies the base station of IDC interference status by transmitting the IDC indication message to the base station (S605).

Figure 7:
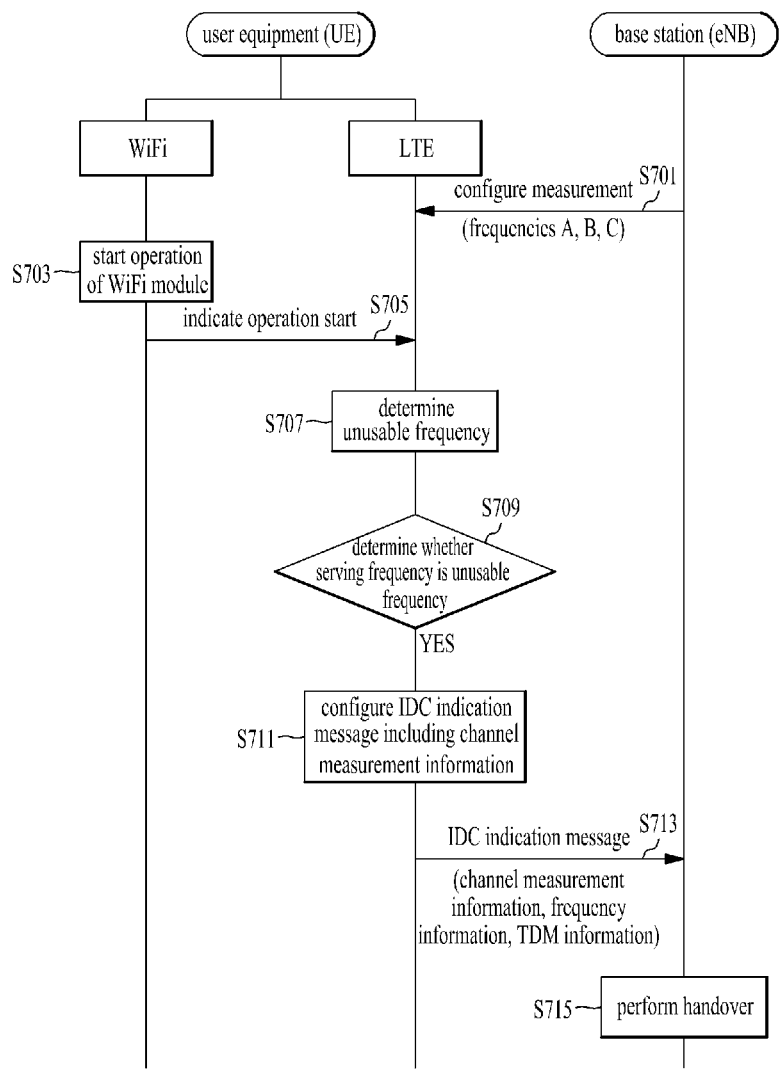
FIG. 7 is a diagram illustrating a method for transmitting channel measurement information, which satisfies a specific reference, if a serving frequency is unusable, in accordance with the present invention.

FIG. 7 is a diagram illustrating a method for transmitting channel measurement information, which satisfies a specific reference, if a serving frequency is unusable, in accordance with one embodiment of the present invention. In FIG. 7, it is assumed that the user equipment is configured to include an LTE module and a WiFi module.

The base station configures measurement for at least one frequency for the user equipment (S701). In this embodiment, it is assumed that measurement for frequencies A, B and C is configured for convenience of description. Accordingly, the LTE module of the user equipment is configured to perform measurement for frequencies A, B and C on the basis of measurement configuration of the base station.

The communication modules that coexist within the user equipment start the operation for data transmission (S703). For example, operation start of the communication modules may be power-on operation of the communication modules or traffic transmission and reception operation of the communication modules, and the communication modules coexisting within the user equipment may include at least one of a transceiver module for WiFi system, a Bluetooth transceiver module, and a global positioning system (GPS) receiving module.

If the Wifi module coexisting within the user equipment starts operation, the Wifi module transmits information such as transmission power and operation frequency of Wifi for measuring IDC interference to the LTE module (S705).

The LTE module recognizes that IDC interference has occurred and determines the unusable frequency on the basis of information received from the Wifi module (S707).

The LTE module identifies whether the unusable frequency determined at the step S707 is the same as the serving frequency (S709). If the unusable frequency is the same as the serving frequency, the LTE module of the user equipment configures an IDC indication message for notifying the base station of the interference status. In configuring the IDC indication message, the LTE module of the user equipment includes channel measurement information (S711). For example, the channel measurement information may be information on a cell that satisfies a specific reference. Accordingly, the LTE module of the user equipment includes the channel measurement information on the corresponding cell in the IDC indication message after selecting a cell having best quality. At this time, frequency, cell identity, and measured result of a cell may be included in the channel measurement information, and unusable frequency information and TDM information may be included in the IDC indication message.

The LTE module transmits the IDC indication message generated at the step S711 to the base station (S713). The base station performs an FDM procedure (for example, handover) considering the channel measurement information on the basis of the received IDC indication message.

Figure 8:
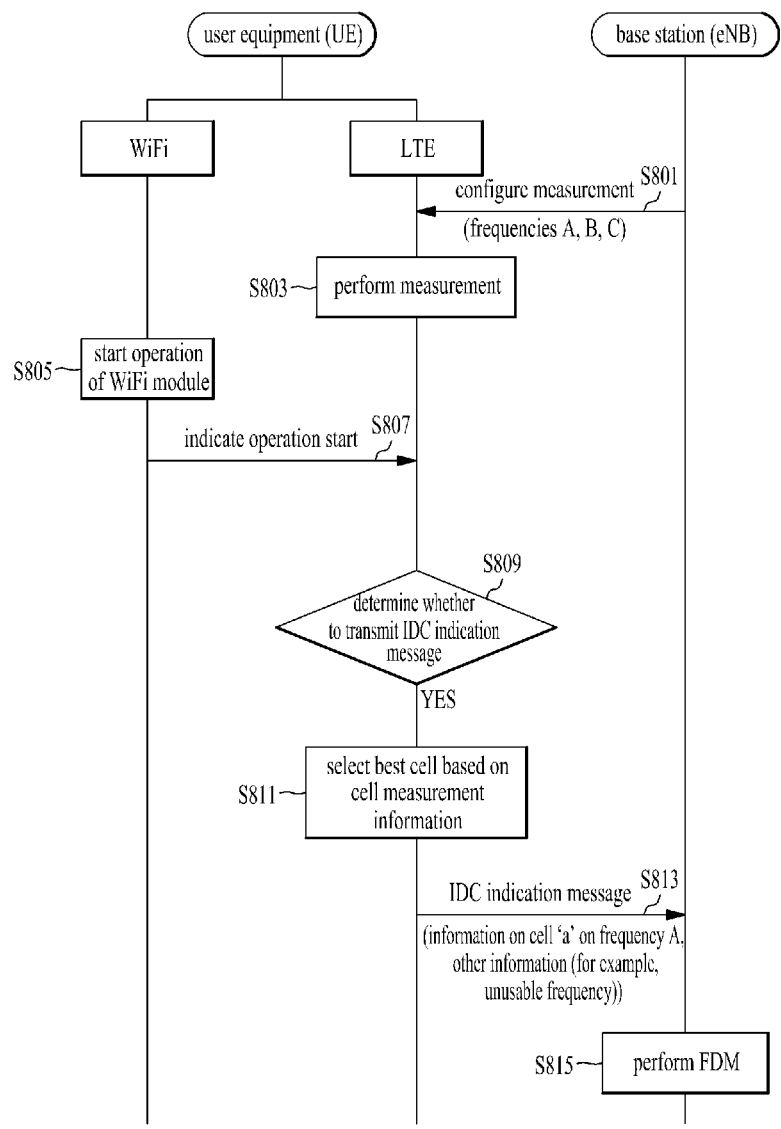
FIG. 8 is a diagram illustrating a method for transmitting channel measurement information considering measurement information on the best cell having best quality in accordance with one embodiment of the present invention.

FIG. 8 is a diagram illustrating a method for selecting best cell having best quality and transmitting measurement information on the selected cell by including the measurement information in an IDC indication message in accordance with one embodiment of the present invention. The same description as the aforementioned description will be omitted. Hereinafter, it is assumed that the LTE module and the Wifi module coexist within the user equipment.

The base station transmits a message associated with measurement configuration for at least one frequency to the user equipment (S801), and the LTE module performs measurement (S803). For example, if frequencies A, B and C are measured and configured from the base station, the user equipment may perform measurement for the frequencies A, B and C.

If the Wifi module within the user equipment starts the operation (S805), the Wifi module transmits information based on operation start indication to the LTE module (S807).

The LTE module determines whether to transmit the IDC indication message to the base station on the basis of information received from the Wifi module (S809). For example, if the unusable frequency due to IDC interference corresponds to the serving frequency, the LTE module may transmit the IDC indication message to the Wifi module.

If the IDC indication message is determined to be transmitted, the LTE module may sort (cell associated) measurement information based on measurement and select the best cell for the sorted measurement information or a specific number of higher cells (S811).

The LTE module transmits the IDC indication message, which includes measurement information on the selected cell, to the base station (S813). The IDC indication message includes information on the best cell having best quality and information on unusable frequency. For example, if the frequency B is the unusable frequency and cell 'a' (on the frequency A) on the measured result associated with the usable frequencies A and C, measurement information associated with the cell 'a' may be included in the IDC indication message. Also, information on the unusable frequency may be included in the IDC indication message together with the measurement information. For another example, measurement information except for cell information only on the unusable frequency may be included in the IDC indication message.

The base station performs FDM (for example, handover) on the basis of the measurement information included in the IDC indication message (S817).

Figure 9:
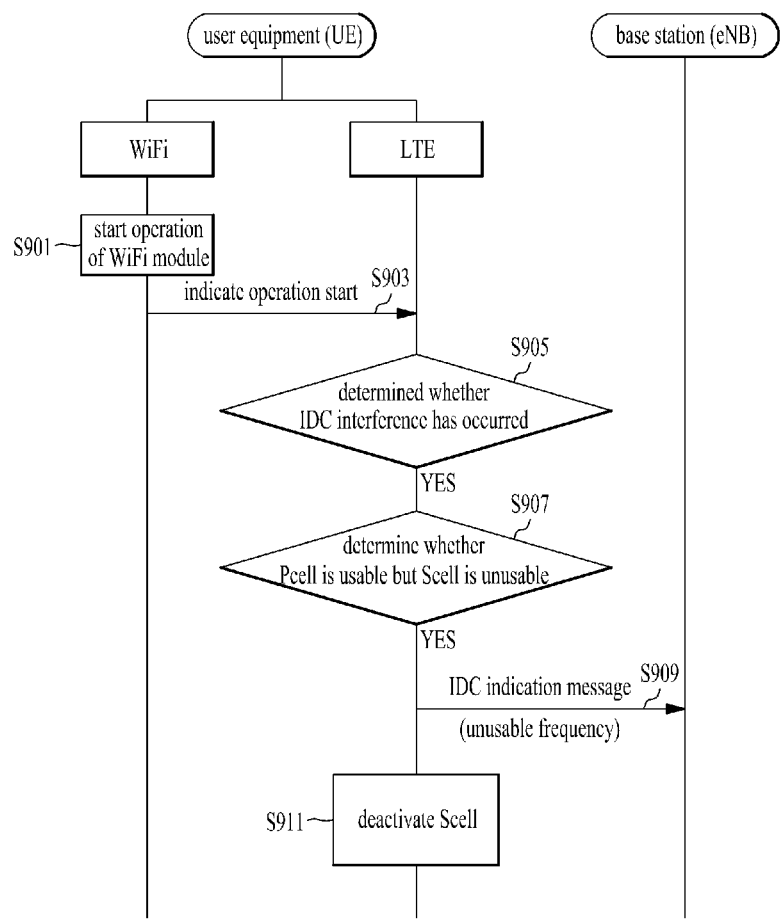
FIG. 9 is a diagram illustrating the embodiment of the present invention in a wireless communication system based on carrier aggregation (CA)

FIG. 9 is a diagram illustrating the embodiment of the present invention in a wireless communication system based on carrier aggregation (CA). The same description as the aforementioned description will be omitted. Hereinafter, it is assumed that the LTE module and the Wifi module coexist within the user equipment.

It is assumed that the base station commands the user equipment to perform measurement configuration for frequencies A, B and C, and the LTE module of the user equipment performs measurement in accordance with the command of the base station.

If the Wifi module coexisting within the user equipment starts operation such as data transmission (S901), the Wifi module transmits an operation start indication message, which includes operation frequency of Wifi and transmission power, to the LTE module (S903), wherein the operation frequency and transmission power are required to identify IDC interference.

The LTE module identifies whether IDC interference has occurred, and identifies unusable frequency if IDC interference occurs (S905).

The LTE module identifies whether Pcell operated on the primary frequency is usable but Scell operated on the secondary frequency is unusable (S907).

If the secondary frequency not the primary frequency is only unusable, the LTE module transmits the IDC indication message, which includes unusable frequency information only (on the secondary frequency) (S909). In other words, in this case, TDM information, cell information, etc. are not included in the IDC indication message.

If the Pcell operated on the primary frequency is unusable, the LTE module may transmit the IDC indication message, which includes channel measurement information (for example, cell identity, frequency information, TDM information, etc.), to the base station. In this case, information associated with the best cell or information associated with a random number of cells having higher quality may only be included in the IDC indication message as the channel measurement information.

Additionally, if the Pcell is unusable, additional information for power control, autonomous denial, etc. as well as information (for example, bitmap and DRX pattern) for performing TDM may be included in the channel measurement information. However, if the Pcell has no IDC problem and the Scell has IDC interference, information associated with TDM, power control, autonomous denial, etc. is not included in the IDC indication message.

The LTE module automatically deactivates the Scell operated on the secondary frequency, which is reported to the base station as unusable (S911). In other words, if the Pcell has no IDC interference problem and only the Scell has a problem, the LTE module deactivates the Scell.

In accordance with transmission of the aforementioned channel measurement information, when the user equipment having IDC interference notifies the base station of IDC interference information, the user equipment may transfer the measured result of a cell at another frequency or another RAT to the base station together with the IDC interference information. As a result, the base station may quickly determine a cell to which the user equipment is subjected to handover, whereby the IDC interference time of the user equipment may be reduced and QoS of the user equipment may be prevented from being deteriorated.

Figure 10:
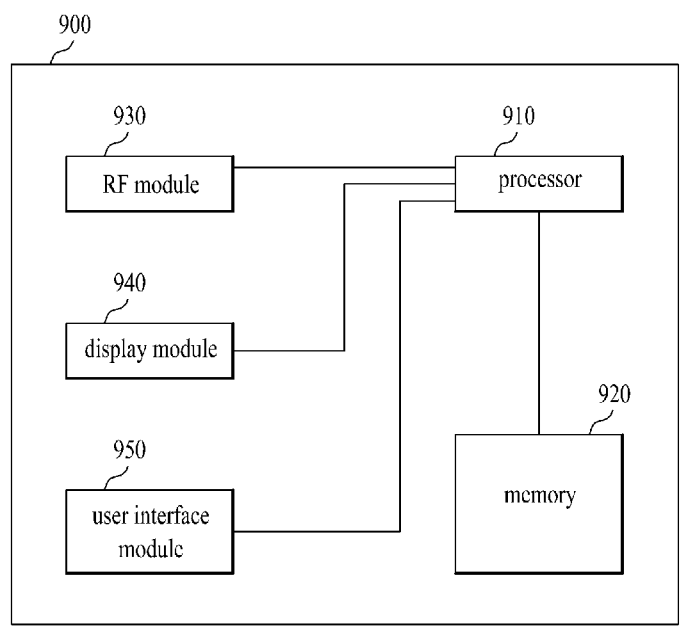
FIG. 10 is a block diagram illustrating a transceiver according to the embodiment of the present invention.

FIG. 10 is a block diagram illustrating a transceiver according to the embodiment of the present invention. The transceiver may be a part of the base station or the user equipment.

Referring to FIG. 10, the transceiver 1000 includes a processor 1010, a memory 1020, a radio frequency (RF) module 1030, a display module 1040, and a user interface module 1050.

The transceiver 1000 is illustrated for convenience of description, and some of its modules may be omitted. Also, the transceiver 1000 may further include necessary modules. Moreover, some modules of the transceiver 1000 may be divided into segmented modules. The processor 1010 is configured to perform the operation according to the embodiment of the present invention illustrated with reference to the drawings.

In more detail, if the transceiver 1000 is a part of the base station, the processor 1010 may serve to generate a control signal and map the generated control signal into a control channel configured within a plurality of frequency blocks. Also, if the transceiver 1000 is a part of the user equipment, the processor 1010 may identify the control channel indicated by the signals received from the plurality of frequency blocks and extract the control signal from the control channel.

Afterwards, the processor 1010 may perform a necessary operation on the basis of the control signal. The detailed operation of the processor 1010 will be understood with reference to the disclosure described with reference to FIG. 1 to FIG. 7.

The memory 1020 is connected with the processor 1010 and stores an operating system, an application, a program code, and data therein. The RF module 1030 is connected with the processor 1010 and converts a baseband signal to a radio signal or vice versa. To this end, the RF module 1030 performs analog conversion, amplification, filtering and frequency uplink conversion, or their reverse processes. The display module 1040 is connected with the processor 1010 and displays various kinds of information. Examples of the display module 1040 include, but not limited to, a liquid crystal display (LCD), a light emitting diode (LED), and an organic light emitting diode (OLED). The user interface module 1050 is connected with the processor 1010, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between a relay node and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as a mobile station (MS) and a mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting an IDC indication message, which includes channel measurement information, in a wireless communication system and the device therefor have been described based on the 3GPP LTE system, they may be applied to various wireless communication systems in addition to the 3GPP LTE system.

The invention claimed is:

1. A method for transmitting channel measurement information by a first communication module of a user equipment to a base station in a wireless communication system supporting a carrier aggregation, the method comprising:
   receiving a message indicating an operation start of at least one second communication module coexisting in the user equipment from the at least one second communication module;
   determining an unusable frequency due to in-device coexistence (IDC) interference on the basis of information on an operating frequency of the first communication module and an operating frequency of the at least one second communication module; and transmitting an IDC interference indication message including channel measurement information corresponding to the determined unusable frequency to the base station, wherein, if the determined unusable frequency is a secondary frequency and a primary frequency is usable, the channel measurement information includes information only on the determined unusable frequency.

2. The method according to claim 1, wherein the channel measurement information is the information associated with a cell, which satisfies a predetermined reference, on at least one frequency not the unusable frequency.

3. The method according to claim 2, wherein the information associated with the cell includes at least one of frequency information associated with the cell and a measured result of the cell.

4. The method according to claim 2, wherein the predetermined reference is defined differently in accordance with radio access technology (RAT).

5. The method according to claim 2, wherein the predetermined reference has the highest channel quality on at least one frequency not the unusable frequency.

6. The method according to claim 5, wherein the channel quality is reference signal received quality (RSRQ).

7. The method according to claim 1, wherein the IDC interference indication message includes information associated with the unusable frequency and time division multiplexing (TDM) information.

8. The method according to claim 1, further comprising: allowing the base station to perform handover for the user equipment.

9. The method according to claim 1, further comprising: deactivating a secondary cell configured on the secondary frequency.

10. The method according to claim 1, wherein operation start of the at least one second communication module is a power on operation of the at least one second communication module or a traffic transmission and reception operation of the at least one second communication module.

11. The method according to claim 1, wherein the at least one second communication module includes a transceiver module for WiFi system, a Bluetooth transceiver module, and a global positioning system (GPS) receiving module.

12. A user equipment in a wireless communication system supporting a carrier aggregation, the user equipment comprising:

a first communication module configured to transmit and receive a signal to and from a first communication system;

at least one second communication module configured to transmit and receive a signal to and from another communication system; and a processor, wherein the first communication module is further configured to:

receive a message indicating an operation start of the at least one second communication module coexisting in the user equipment from the at least one second communication module, determine an unusable frequency due to in-device coexistence (IDC) interference on the basis of information on an operating frequency of the first communication module and an operating frequency of the at least one second communication module, and transmit an IDC interference indication message including channel measurement information corresponding to the determined unusable frequency to the base station, and wherein, if the determined unusable frequency is a secondary frequency and a primary frequency is usable, the channel measurement information includes information only on the determined unusable frequency.

13. The user equipment according to claim 12, wherein the channel measurement information is information associated with a cell, which satisfies a predetermined reference defined differently in accordance with radio access technology (RAT), on at least one frequency not the unusable frequency, wherein the information associated with the cell includes at least one of frequency information associated with the cell and a measured result of the cell, and wherein the predetermined reference has a highest channel quality on the at least one frequency not the unusable frequency.

14. The user equipment according to claim 12, wherein the IDC interference indication message includes information associated with the unusable frequency and time division multiplexing (TDM) information.

15. The user equipment according to claim 12, wherein the processor is further configured to allow that the base station to perform a handover for the user equipment.

16. The user equipment according to claim 12, wherein the processor is further configured to deactivate a secondary cell configured on the secondary frequency.

17. The user equipment according to claim 12, wherein an operation start of the at least one second communication module is a power on operation of the at least one second communication module or a traffic transmission and reception operation of the at least one second communication module.

18. The user equipment according to claim 12, wherein the at least one second communication module includes at least one of a transceiver module for WiFi system, a Bluetooth transceiver module, and a global positioning system (GPS) receiving module.

* * * * *